(12) United States Patent
Duan et al.

(10) Patent No.: US 12,117,547 B2
(45) Date of Patent: Oct. 15, 2024

(54) BASE STATION ANTENNA ARRAY ORIENTATION CALIBRATION FOR CELLULAR POSITIONING

(71) Applicant: QUALCOMM Incorporated, San Diego, CA (US)

(72) Inventors: Weimin Duan, San Diego, CA (US); Alexandros Manolakos, Escondido, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 624 days.

(21) Appl. No.: 17/376,873

(22) Filed: Jul. 15, 2021

(65) Prior Publication Data

US 2022/0018925 A1    Jan. 20, 2022

Related U.S. Application Data

(60) Provisional application No. 63/053,447, filed on Jul. 17, 2020.

(51) Int. Cl.
| | | |
|---|---|---|
| *G01S 5/02* | (2010.01) | |
| *G01S 5/08* | (2006.01) | |
| *G01S 19/01* | (2010.01) | |
| *H04W 64/00* | (2009.01) | |

(52) U.S. Cl.
CPC ............. *G01S 5/021* (2013.01); *G01S 5/08* (2013.01); *G01S 19/01* (2013.01); *H04W 64/003* (2013.01)

(58) Field of Classification Search
CPC .. G01S 5/21; G01S 5/08; G01S 19/01; H04W 64/003
USPC .......... 342/357.39, 357.29, 357.43, 450, 458
See application file for complete search history.

(56) References Cited

U.S. PATENT DOCUMENTS

| | | | |
|---|---|---|---|
| 7,948,438 B1 | 5/2011 | Francis | |
| 2016/0126753 A1* | 5/2016 | Wight | H02J 50/90 |
| | | | 307/104 |
| 2018/0375594 A1* | 12/2018 | Kildal | H01Q 21/061 |

FOREIGN PATENT DOCUMENTS

| | | |
|---|---|---|
| WO | 2015114355 A1 | 8/2015 |
| WO | 2019245310 A1 | 12/2019 |
| WO | 2020052990 A1 | 3/2020 |

OTHER PUBLICATIONS

International Search Report and Written Opinion—PCT/US2021/042035—ISA/EPO—Nov. 12, 2021.

* cited by examiner

*Primary Examiner* — Bo Fan
(74) *Attorney, Agent, or Firm* — QUALCOMM Incorporated

(57) ABSTRACT

Disclosed are techniques for wireless communication. In an aspect, a network entity determines a location of a target base station and a location of at least one reference device, determines an angle-of-arrival (AoA) measurement of one or more reference signals received by at least one antenna array of the target base station from the at least one reference device, determines an expected AoA between the at least one antenna array and the at least one reference device based on the location of the target base station and the location of the at least one reference device, and determines an orientation offset of the at least one antenna array based on a difference between the expected AoA and the AoA measurement.

27 Claims, 10 Drawing Sheets

BASE STATION ANTENNA ARRAY ORIENTATION CALIBRATION FOR CELLULAR POSITIONING

CROSS-REFERENCE TO RELATED APPLICATIONS

The present application for patent claims the benefit of U.S. Provisional Application No. 63/053,447, entitled "BASE STATION ANTENNA ARRAY ORIENTATION CALIBRATION FOR CELLULAR POSITIONING," filed Jul. 17, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a network entity includes determining a location of a target base station and a location of at least one reference device; determining an angle-of-arrival (AoA) measurement of one or more reference signals received by at least one antenna array of the target base station from the at least one reference device; determining an expected AoA between the at least one antenna array and the at least one reference device based on the location of the target base station and the location of the at least one reference device; and determining an orientation offset of the at least one antenna array based on a difference between the expected AoA and the AoA measurement.

In an aspect, a network entity includes a memory; at least one transceiver; and at least one processor communicatively coupled to the memory and the at least one transceiver, the at least one processor configured to: determine a location of a target base station and a location of at least one reference device; determine an angle-of-arrival (AoA) measurement of one or more reference signals received by at least one antenna array of the target base station from the at least one reference device; determine an expected AoA between the at least one antenna array and the at least one reference device based on the location of the target base station and the location of the at least one reference device; and determine an orientation offset of the at least one antenna array based on a difference between the expected AoA and the AoA measurement.

In an aspect, a network entity includes means for determining a location of a target base station and a location of at least one reference device; means for determining an angle-of-arrival (AoA) measurement of one or more reference signals received by at least one antenna array of the target base station from the at least one reference device; means for determining an expected AoA between the at least one antenna array and the at least one reference device based on the location of the target base station and the location of the at least one reference device; and means for determining an orientation offset of the at least one antenna array based on a difference between the expected AoA and the AoA measurement.

In an aspect, a non-transitory computer-readable medium storing computer-executable instructions that, when executed by a network entity, cause the network entity to: determine a location of a target base station and a location of at least one reference device; determine an angle-of-arrival (AoA) measurement of one or more reference signals received by at least one antenna array of the target base station from the at least one reference device; determine an expected AoA between the at least one antenna array and the at least one reference device based on the location of the target base station and the location of the at least one reference device; and determine an orientation offset of the at least one antenna array based on a difference between the expected AoA and the AoA measurement.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
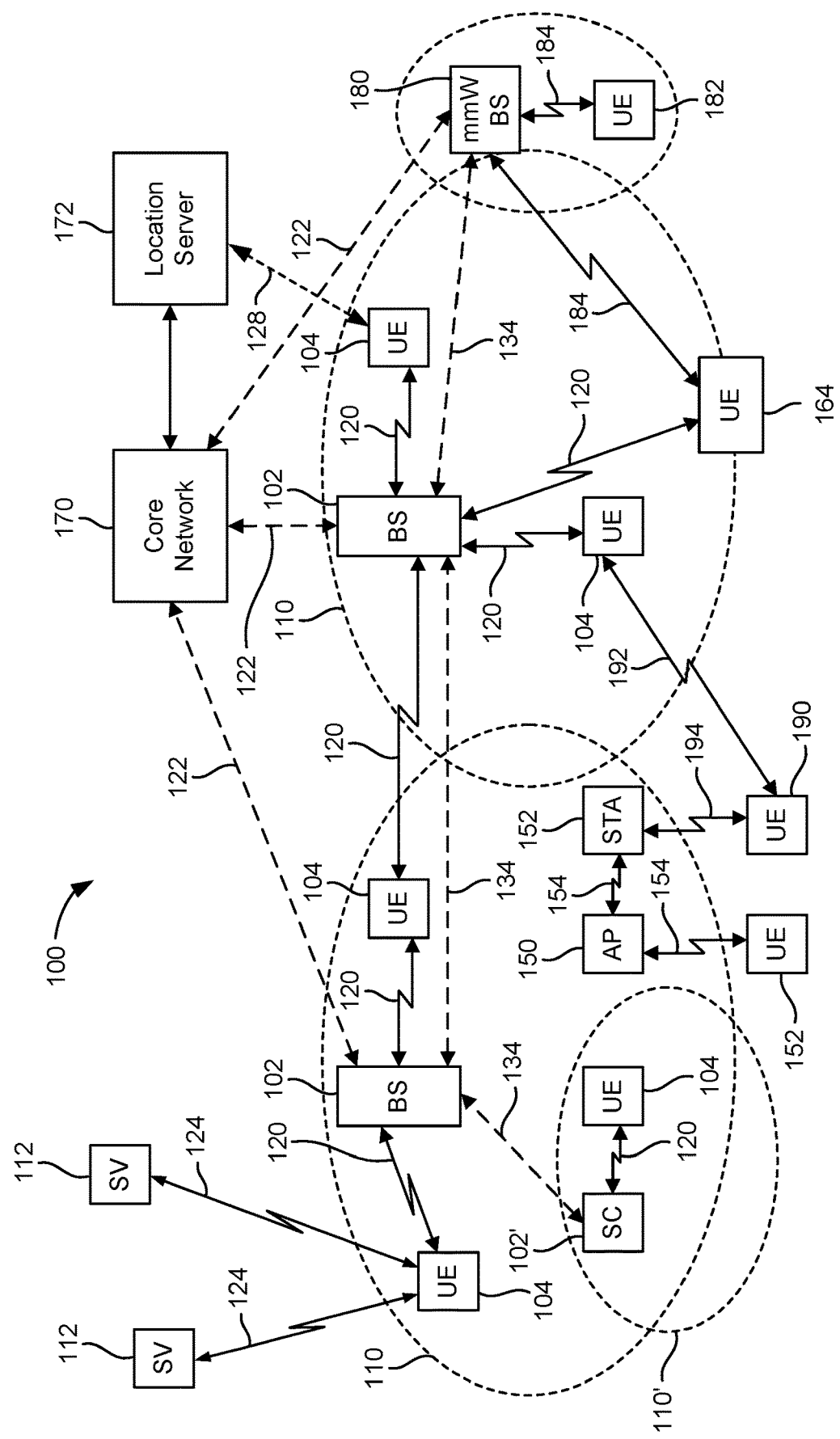
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs)

152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
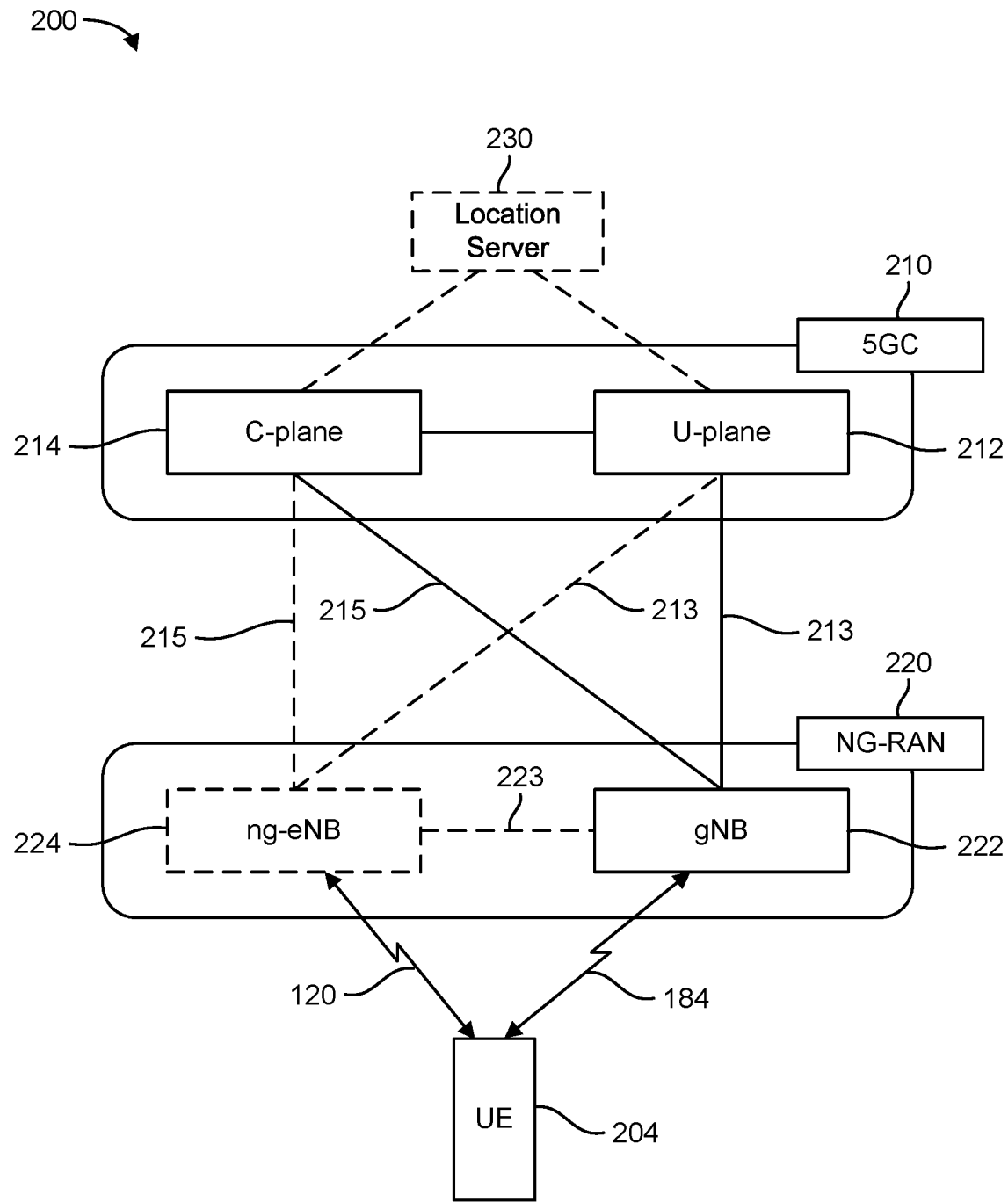
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
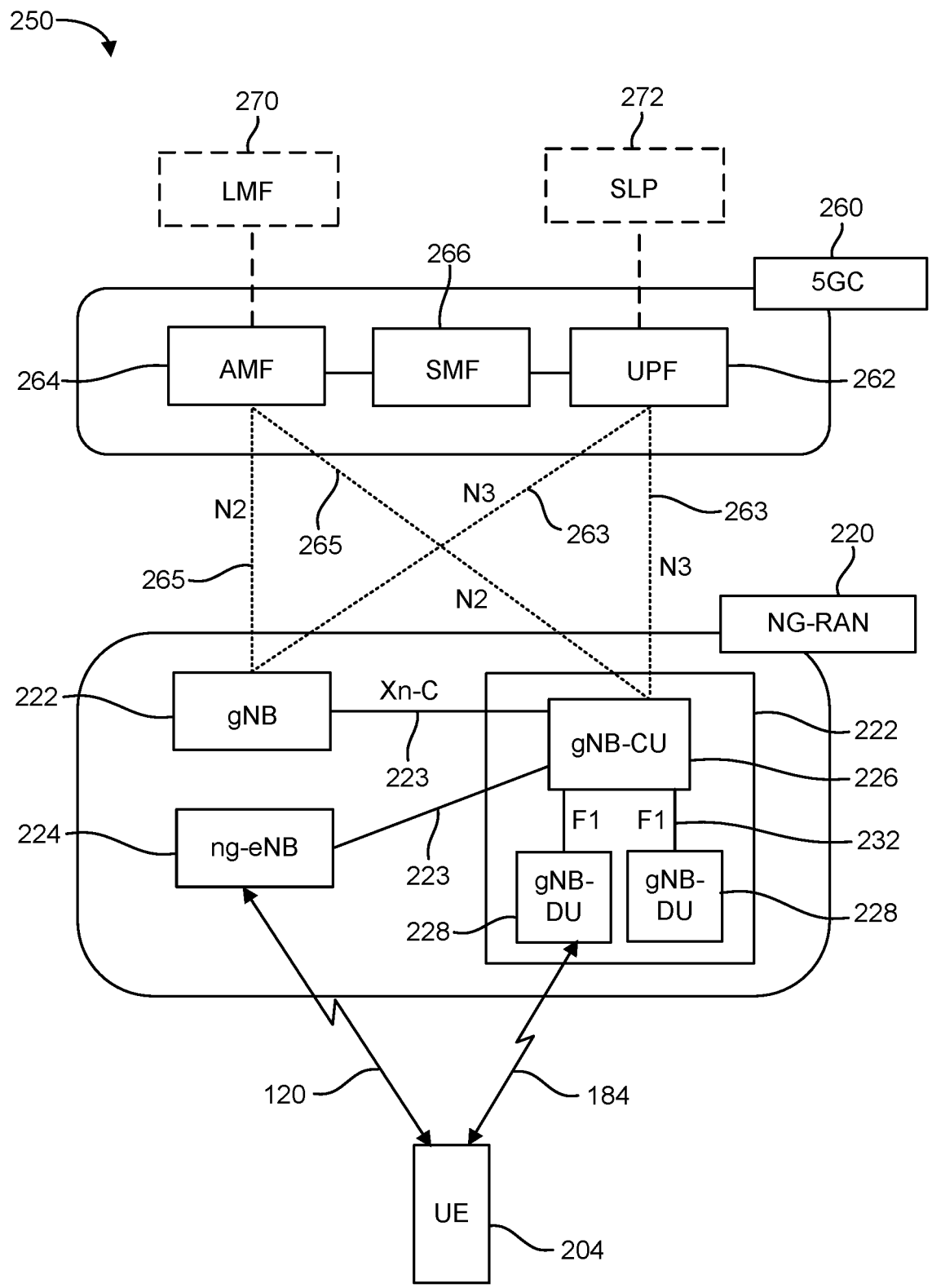

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
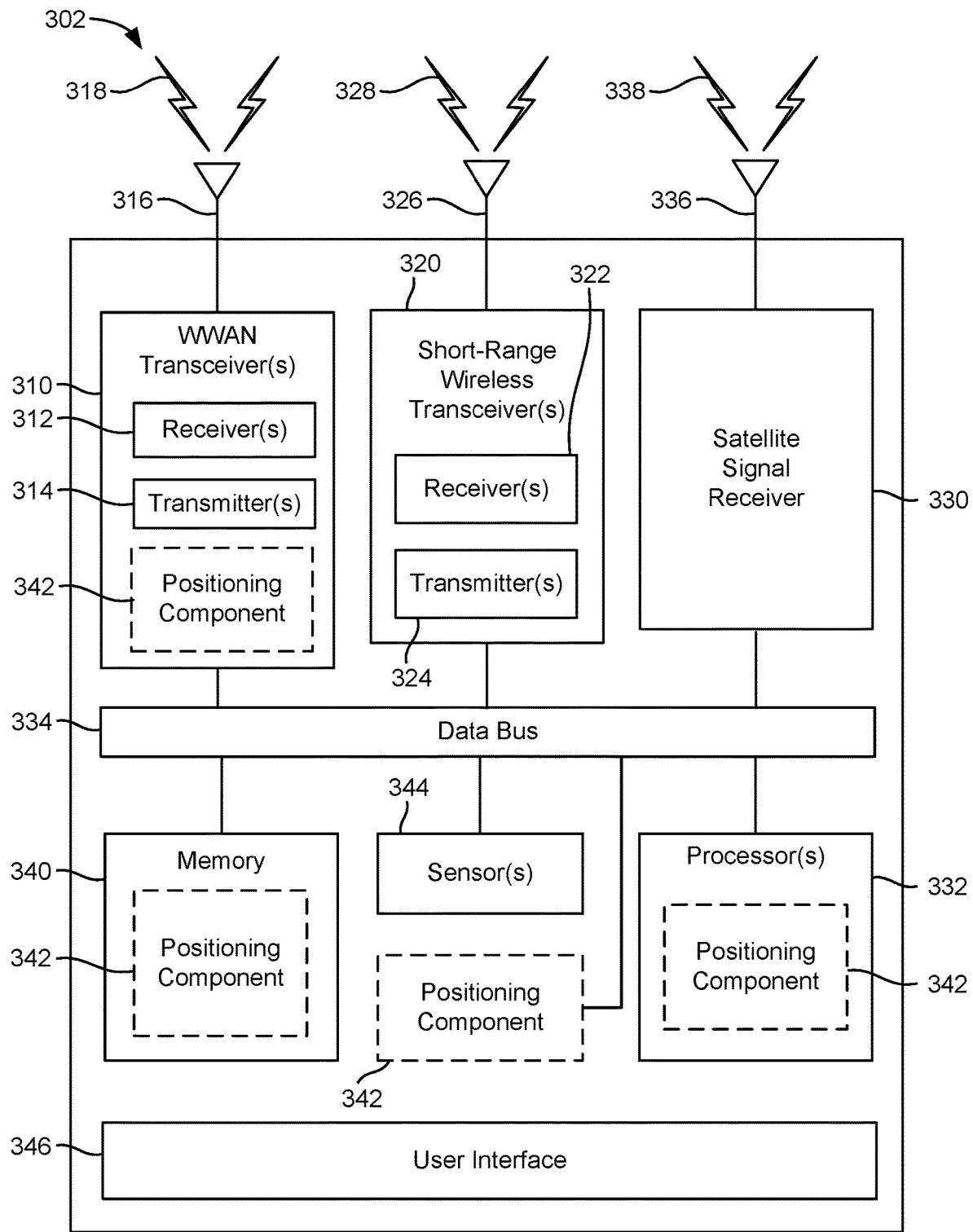
FIGS. 3A, 3B, and 3C are simplified block diagrams of several sample aspects of components that may be employed in a user equipment (UE), a base station, and a network entity, respectively, and configured to support communications as taught herein.
Figure 3B:
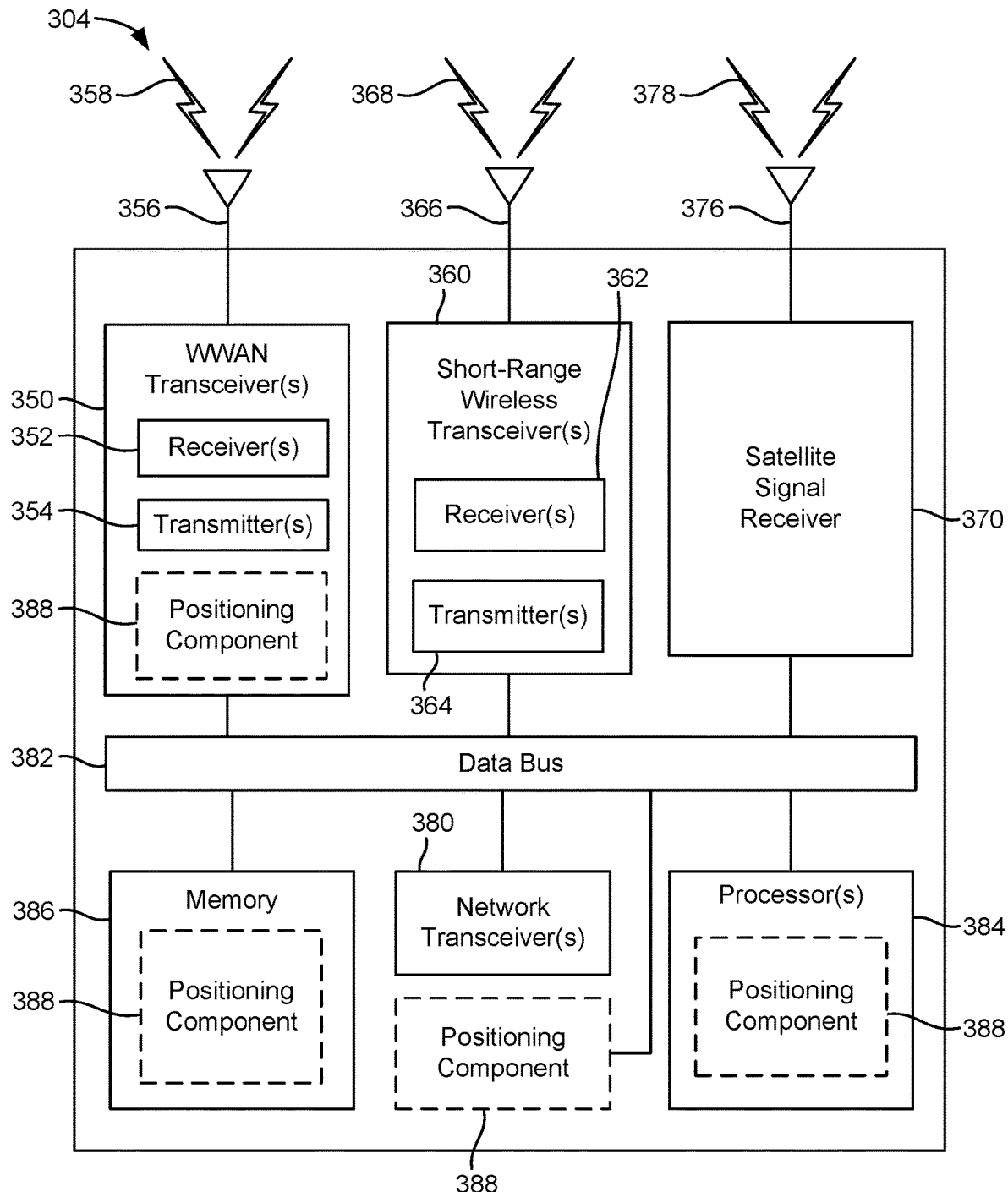
Figure 3C:
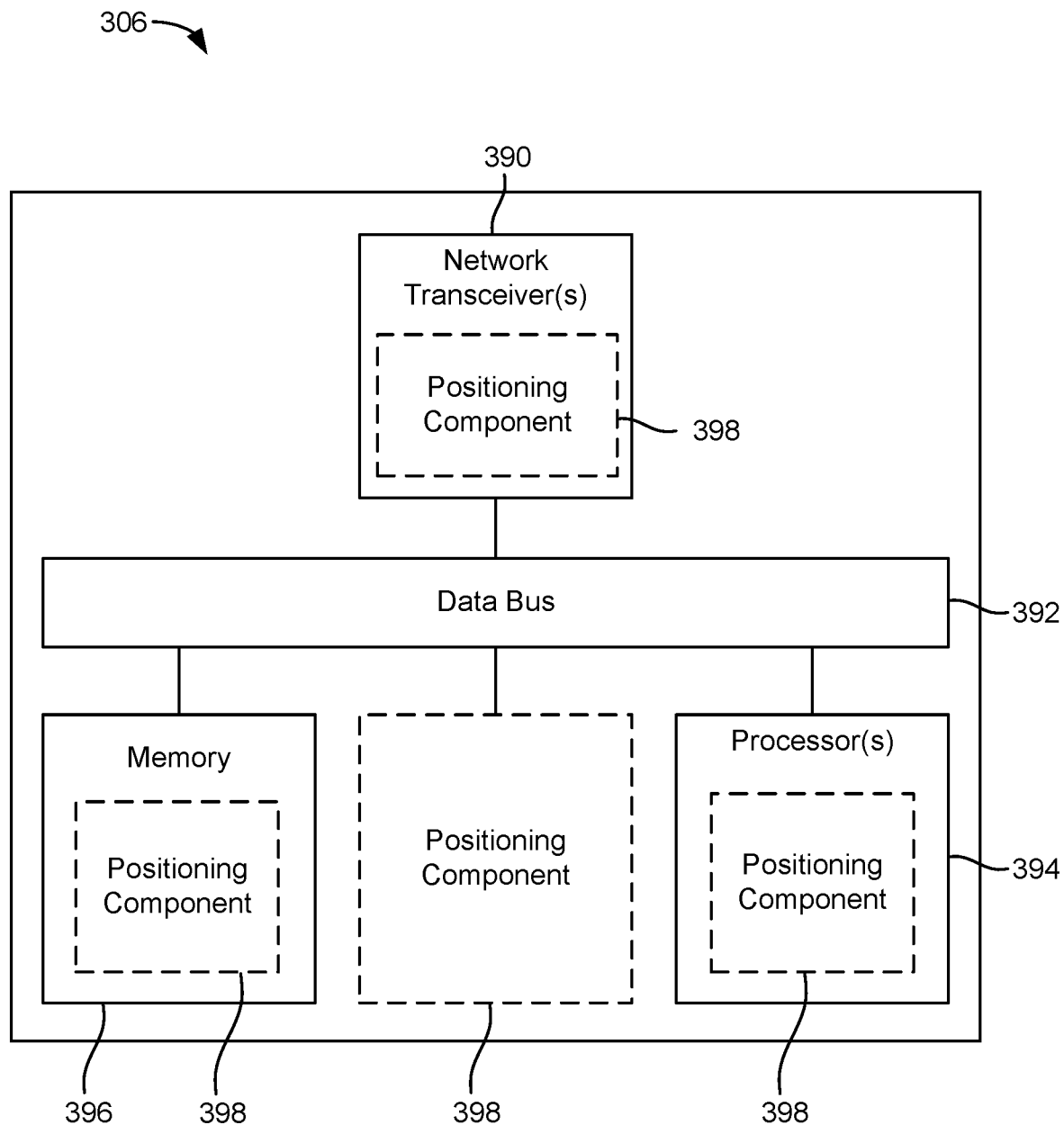

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4:
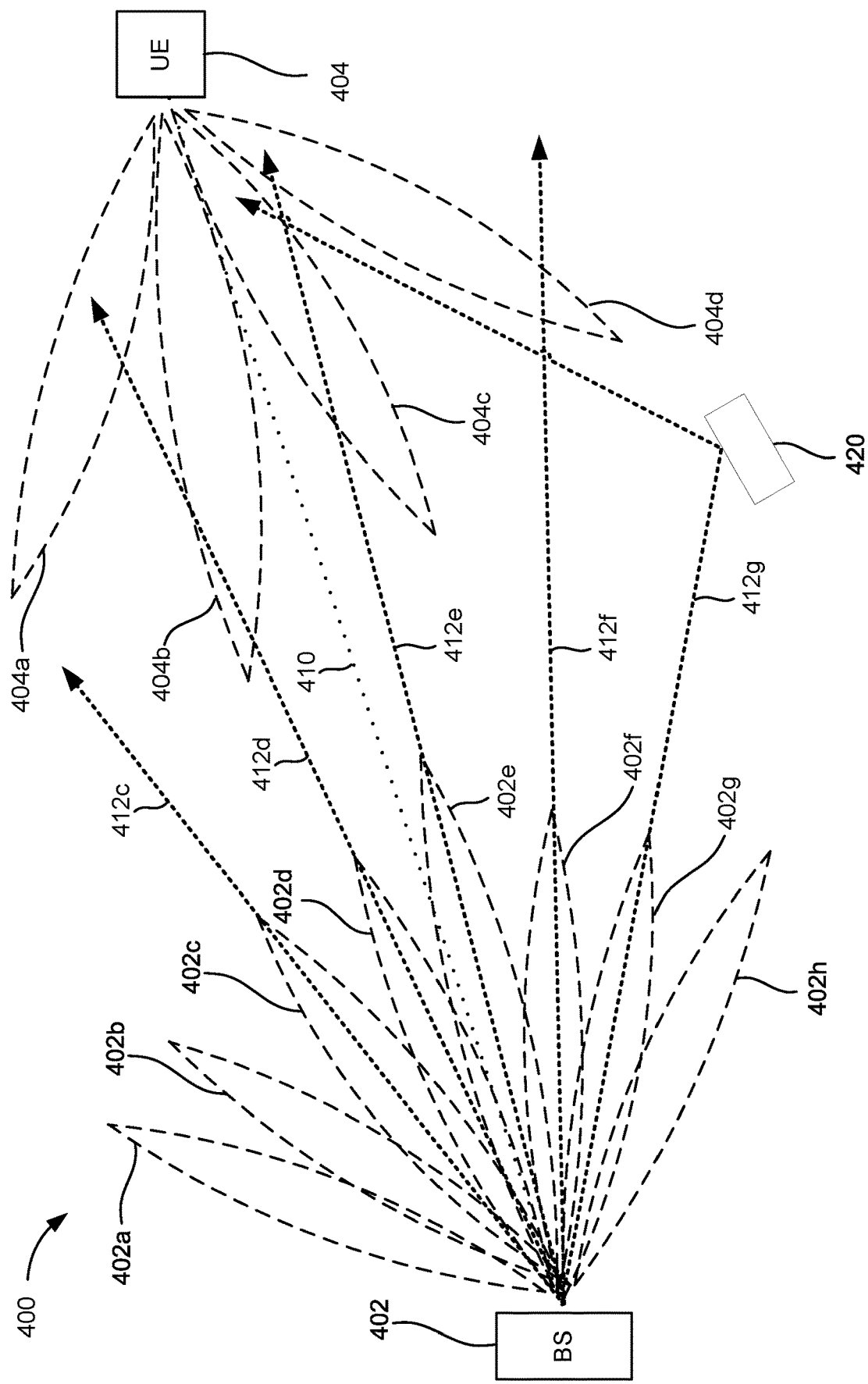
FIG. 4 is a diagram illustrating an example base station in communication with an example UE, according to aspects of the disclosure.

FIG. 4 is a diagram 400 illustrating a base station (BS) 402 (which may correspond to any of the base stations described herein) in communication with a UE 404 (which may correspond to any of the UEs described herein). Referring to FIG. 4, the base station 402 may transmit a beamformed signal to the UE 404 on one or more transmit beams 402a, 402b, 402c, 402d, 402e, 402f, 402g, 402h, each having a beam identifier that can be used by the UE 404 to identify the respective beam. Where the base station 402 is beamforming towards the UE 404 with a single array of antennas (e.g., a single TRP/cell), the base station 402 may perform a "beam sweep" by transmitting first beam 402a, then beam 402b, and so on until lastly transmitting beam 402h. Alternatively, the base station 402 may transmit beams 402a-402h in some pattern, such as beam 402a, then beam 402h, then beam 402b, then beam 402g, and so on. Where the base station 402 is beamforming towards the UE 404 using multiple arrays of antennas (e.g., multiple TRPs/cells), each antenna array may perform a beam sweep of a subset of the beams 402a-402h. Alternatively, each of beams 402a-402h may correspond to a single antenna or antenna array.

FIG. 4 further illustrates the paths 412c, 412d, 412e, 412f, and 412g followed by the beamformed signal transmitted on beams 402c, 402d, 402e, 402f, and 402g, respectively. Each path 412c, 412d, 412e, 412f, 412g may correspond to a single "multipath" or, due to the propagation characteristics of radio frequency (RF) signals through the environment, may be comprised of a plurality (a cluster) of "multipaths." Note that although only the paths for beams 402c-402g are shown, this is for simplicity, and the signal transmitted on each of beams 402a-402h will follow some path. In the example shown, the paths 412c, 412d, 412e, and 412f are straight lines, while path 412g reflects off an obstacle 420 (e.g., a building, vehicle, terrain feature, etc.).

The UE 404 may receive the beamformed signal from the base station 402 on one or more receive beams 404a, 404b, 404c, 404d. Note that for simplicity, the beams illustrated in FIG. 4 represent either transmit beams or receive beams, depending on which of the base station 402 and the UE 404 is transmitting and which is receiving. Thus, the UE 404 may also transmit a beamformed signal to the base station 402 on one or more of the beams 404a-404d, and the base station 402 may receive the beamformed signal from the UE 404 on one or more of the beams 402a-402h.

In an aspect, the base station 402 and the UE 404 may perform beam training to align the transmit and receive beams of the base station 402 and the UE 404. For example, depending on environmental conditions and other factors, the base station 402 and the UE 404 may determine that the best transmit and receive beams are 402d and 404b, respectively, or beams 402e and 404c, respectively. The direction of the best transmit beam for the base station 402 may or may not be the same as the direction of the best receive beam, and likewise, the direction of the best receive beam for the UE 404 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

In the example of FIG. 4, if the base station 402 transmits reference signals to the UE 404 on beams 402c, 402d, 402e, then transmit beam 402d is best aligned with the line of sight (LOS) path 410, while transmit beams 402c and 402e are not. As such, beam 402d will have a stronger and/or earlier channel impulse response and higher received signal strength at the UE 404 than beams 402c and 402e. The UE 404 can report the channel impulse response and received signal strength of each measured transmit beam 402c, 402d, 402e to the base station 402, or alternatively, the identity of the transmit beam having the strongest/earliest channel impulse response and highest received signal strength (beam 402d in the example of FIG. 4). In either case, the base station 402 can estimate the angle from itself to the UE 404 as the angle of the transmit beam having the highest received signal strength and strongest/earliest channel impulse response at the UE 404, here, transmit beam 402d.

Figure 5:
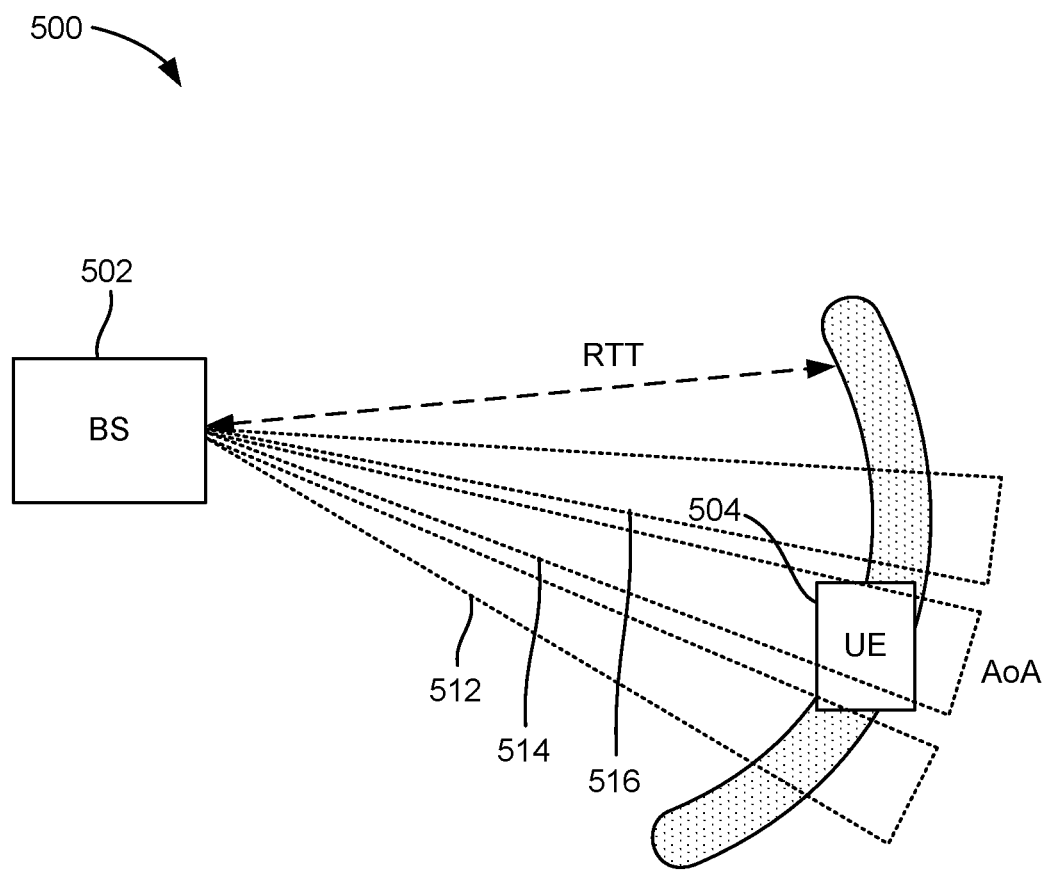
FIGS. 5 and 6 illustrate example uplink angle-of-arrival (UL-AoA) based positioning procedures, according to aspects of the disclosure.

FIG. 5 is a diagram 500 of an example UL-AoA positioning procedure, according to aspects of the disclosure. In the example of FIG. 5, a base station (BS) 502 (e.g., any of the base stations described herein) receives one or more reference signals (e.g., UL-PRS, SRS, DMRS, etc.) from a UE 504 (e.g., any of the UEs described herein) on a plurality of uplink receive beams 512, 514, and 516. The base station 502 determines the angle of the best receive beam 512, 514, or 516 used to receive the one or more reference signals from the UE 504 as the angle from itself to the UE 504. The angle of the receive beam on which the base station 502 receives the one or more reference signals from the UE 504 is referred to as the "angle-of-arrival," or "AoA," between the base station 502 and the UE 504.

In greater detail, each of the receive beams 512, 514, and 516 will likely result in a different received signal strength (e.g., RSRP, RSRQ, SINR, etc.) of the one or more reference signals at the base station 502. Further, the channel impulse response of the one or more reference signals will likely be smaller and/or later for receive beams that are further from the actual LOS path between the base station 502 and the UE 504 than for receive beams that are closer to the LOS path.

Likewise, the received signal strength will likely be lower for receive beams that are further from the LOS path than for receive beams that are closer to the LOS path. In the example of FIG. 5, receive beam 514 is closest to the LOS path between the base station 502 and the UE 504, and as such, will likely have the strongest and/or earliest channel impulse response and the highest received signal strength. As such, the base station 502 estimates the AoA from itself to the UE 504 as the angle of the receive beam 514.

Note that the AoA of the receive beam resulting in the highest received signal strength and strongest/earliest channel impulse response does not necessarily lie along the LOS path. However, for AoA-based positioning purposes, it is assumed to do so.

Where the UE 504 is estimating its location (i.e., the UE is the positioning entity), it needs to obtain the geographic location of the base station 502. The UE 504 may obtain the location from, for example, the base station 502 itself or a location server (e.g., location server 230, LMF 270, SLP 272). With the knowledge of the distance to the base station 502 (based on the RTT or timing advance), the angle between the base station 502 and the UE 504 (based on the AoA of the best receive beam 510), and the known geographic location of the base station 502, the UE 504 can estimate its location.

Alternatively, where a positioning entity, such as the base station 502 or a location server, is estimating the location of the UE 504, the base station 502 reports the AoA of the receive beam 514 resulting in the highest received signal strength and strongest/earliest channel impulse response of the reference signals received from the UE 504, or all received signal strengths and channel impulse responses for all receive beams 512, 514, and 516 (which allows the positioning entity to determine the best receive beam). The base station 502 may additionally estimate the distance between itself and the UE 504 by performing an RTT positioning procedure with the UE 504 and report the distance to the UE 504 or the positioning entity (if not the UE 504). The positioning entity can then estimate the location of the UE 504 based on the UE's 504 distance to the base station 502 (if available), the AoA of the identified receive beam 514, and the known geographic location of the base station 502.

Figure 6:
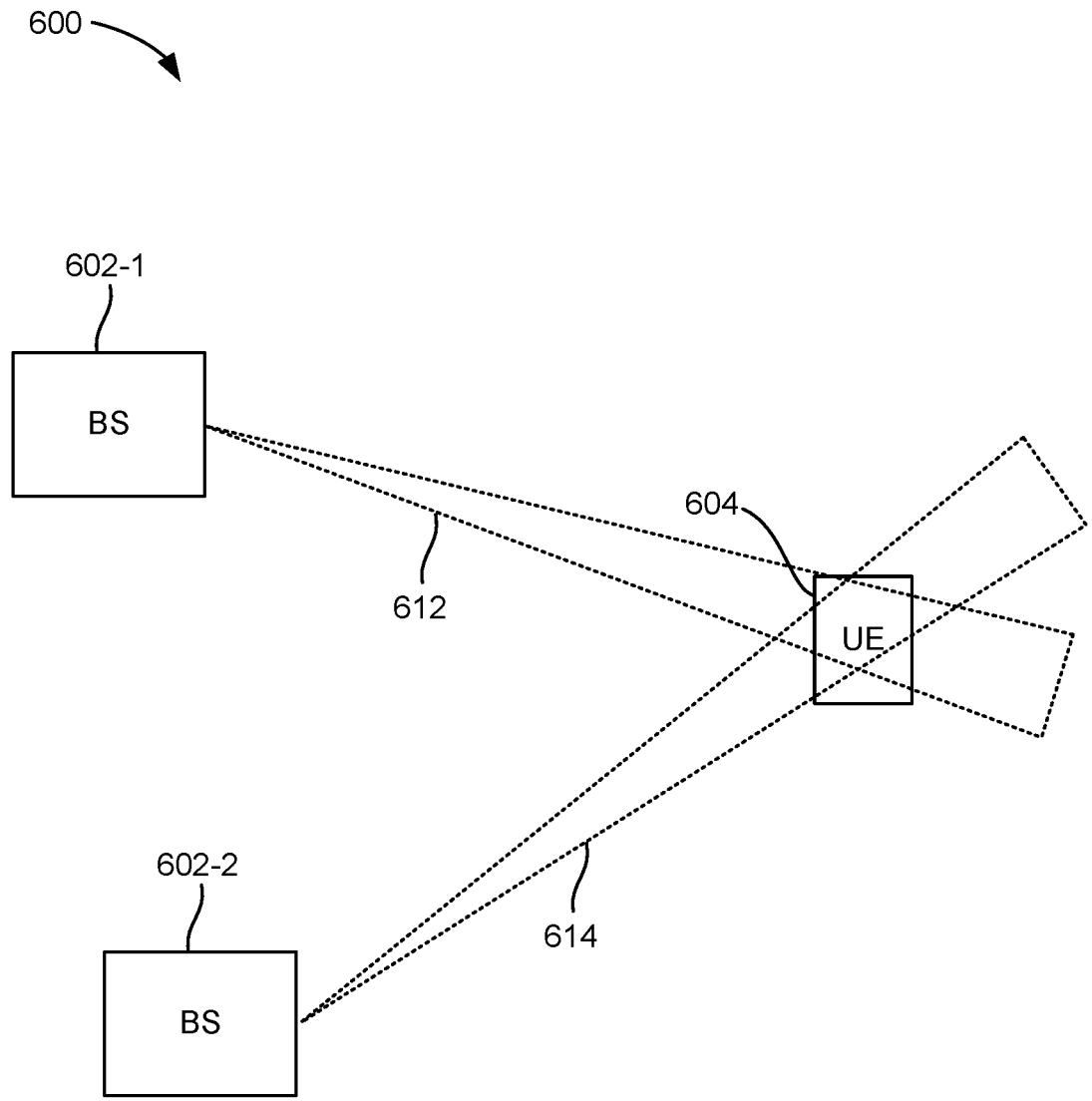

FIG. 6 is a diagram 600 of an example UL-AoA positioning procedure, according to aspects of the disclosure. In the example of FIG. 6, there are two involved base stations 602-1 and 602-2 (collectively, base stations 602), and each base station (BS) 602 has determined the best uplink receive beam on which to receive one or more reference signals (e.g., UL-PRS, SRS, DMRS, etc.) from a UE 604 (e.g., any of the UEs described herein). As illustrated, the best receive beam for base station 602-1 is receive beam 612 and the best receive beam for base station 602-2 is receive beam 614.

The base stations 602 may report the determined AoAs between themselves and the UE 604 (i.e., the angles of receive beams 612 and 614) to the positioning entity (e.g., a location server, the serving base station, the UE). With this information, and knowledge of the base stations' 602 geographic locations, the positioning entity can estimate a location of the UE 604 as the intersection of the received AoAs. There is no need in this situation to perform an RTT positioning procedure between the base stations 602 and the UE 604.

Note that there should be at least two involved base stations 602 for a two-dimensional (2D) location solution, but as will be appreciated, the more base stations 602 that are involved in the positioning procedure, the more accurate the estimated location of the UE 604 will be. Thus, while FIG. 6 illustrates two base stations 602, as will be appreciated, there may be more than two base stations 602.

The angle between a base station and a UE, as determined by the angle of the uplink receive beam for UL-AoA positioning, can be reported as an AoA (and denoted "$\phi$") and a zenith of arrival (ZoA) (and denoted "$\theta$"). The AoA and ZoA define the estimated angle to a UE with respect to a reference direction that is determined by the base station receiving the reference signal(s) from the UE. The reference direction can be defined according to a global coordinate system (GCS) or a local coordinate system (LCS).

For a GCS, the reference direction is defined with respect to the GCS as follows. For AoA, the reference direction (i.e., $\phi$=0 degrees) is the direction of geographical North, and angles increase in a counterclockwise direction. Thus, for example, $\phi$=90 degrees points to geographical West. For ZoA, the reference direction (i.e., $\theta$=0 degrees) is the zenith/vertical direction. Thus, for example, $\theta$=90 degrees points to the horizon.

For an LCS, the reference direction is defined in 3GPP Technical Specification (TS) 38.901 (which is publicly available and incorporated by reference herein in its entirety) as follows. For AoA, the reference direction is the x-axis of the antenna array, and angles increase in a counterclockwise direction. Thus, for example, $\phi$=0 degrees points along the x-axis, and $\phi$=90 degrees points along the y-z plane. For ZoA, the reference direction is the z-axis of the antenna array. Thus, for example, $\theta$=0 degrees points along the z-axis and $\theta$=90 degrees points along the x-y plane.

The translation of the LCS of the antenna array to the GCS is based on the known orientation of the antenna array in the GCS. Specifically, the orientation of the antenna array can be represented by the set of angles $\alpha$ (bearing angle), $\beta$ (downtilt angle), and $\gamma$ (slant angle) in the GCS. These angles may be reported (if not already known by the positioning entity) together with the AoA ($\phi$) and ZoA ($\theta$) in the LCS and can be used to convert LCS AoAs to GCS AoAs.

The reference direction for an AoA/ZoA report in the LCS of the antenna array is based on (i.e., defined with respect to) the orientation of the antenna array. Each base station should have been calibrated (e.g., at the time of installation) such that the antenna array orientation in the GCS is known. However, it is possible that the antenna array's orientation may change during its service life. For example, the weather or a natural disaster (e.g., an earthquake) may cause the antenna array's orientation to change. It is also possible that there may be some residual calibration error during the initial antenna array setup.

The network (e.g., location server 230, LWF 270, SLP 272) may not be aware of the change to the antenna array's orientation, which, as will be appreciated, may result in positioning error when using angle-based positioning techniques, such as UL-AoA or DL-AoD. Even if the network is aware of the issue, sending a technician to re-calibrate the antenna array manually may be quite costly, even more so if the antenna array is difficult to access. Accordingly, the present disclosure provides techniques for calibrating an antenna array using over-the-air NR positioning techniques.

A first technique described herein is base station-assisted over-the-air antenna array orientation calibration. In this technique, reference signals received at a target base station from one or more neighboring base stations can be used to calibrate one or more antenna arrays of the target base station. A base station's location (and possibly the location of each antenna array of the base station) is known to the network and should be fixed, barring any dramatic environmental change. However, in the event that a base station's location has changed since the last time it was determined, an initial stage of the calibration method is to measure each involved base station's location using, for example, GPS, and report this location to the network. The location of a base station may be the center point of the base station, the center point of each antenna array, or both. Here, the involved base stations may be all base stations in the network or some set of base stations expected to be in the vicinity of the target base station (i.e., the base station to be calibrated) based on their currently stored locations plus the target base station.

Once the locations of the involved base stations have been confirmed or updated, the network can select the nearest base stations to the target base station or the base stations with the best channel conditions for positioning. For example, the base stations having the best channel conditions for positioning may be the base stations that are expected to be able to communicate with the target base station over the LOS path/channel. Such base stations may be identified based on their known locations with respect to each other and knowledge of the surrounding environment (e.g., topography, street map, building layout, etc.).

The selection could also, or alternatively, be based on the target base station's measurements of reference signals received from neighboring base stations. For example, the target base station may identify a set of neighboring base stations that have a signal strength above some threshold or a channel impulse response that indicates that the reference signals followed the LOS path. The target base station may then recommend the identified set of neighboring base stations to the network as the set of base stations to use for the calibration.

The network may then coordinate the reference signal configuration to be used among the selected base stations. The configuration may specify the reference signal type, such as PRS, CSI-RS, SRS (in this case transmitted by a base station), etc. The configuration may also specify the time/frequency configuration of the reference signals (e.g., which resource elements, resource blocks, slots, subframes, etc.) and the system frame number at which to begin the reference signal transmissions. In addition, as the spatial relationship (e.g., direction and distance) between each selected base station and the target base station can be derived based on each base station's location (at least in the azimuth), the network may also configure the base stations to beamform the reference signals in that direction to reduce the impact of potential NLOS paths for the subsequent AoA measurements.

Once configured, the selected base stations (which may be only one base station) transmit the configured reference signals to the target base station and the target base station measures the AoA of the reference signals as received by one or more of its antenna arrays. For example, the selected base stations may be selected such that they are clustered to one side of the target base station and thereby facing one antenna array (typically configured as a panel) of the target base station. In this case, the reference signals will likely be received, and the AoA measured, by that antenna array. As another example, the selected base stations may surround the target base station and as such, the reference signals may be received, and the AoAs measured, by all of the antenna arrays of the target base station.

The reference direction of the receiving antenna array(s) may then be calibrated based on the AoA measurements. For example, the target base station may report each AoA measurement for an antenna array with respect to its existing reference direction. The network may then derive what the AoA between the antenna array and each measured base station should be based on the known locations of the base stations (referred to as the "genie" AoA or "expected" AoA). The difference between a measured AoA and the corresponding "genie" AoA is the orientation offset of a receiving antenna array of the target base station. The network may then use this offset to calibrate the reference direction associated with that antenna array of the target base station and any AoA measurement reported for that antenna array by the target base station.

Alternatively, the target base station may compute the offset locally, if it is provided with the locations of the selected base stations. The target base station may then send the calculated orientation offset or the now-calibrated reference direction to the network or any UEs with which it is engaged in a DL-AoA positioning procedure. In this case, any AoA measurements reported by the target base station would not need to be calibrated on the network side, as the reference direction will have already been calibrated.

A second technique described herein is UE-assisted over-the-air base station antenna array orientation calibration. In this technique, reference signals received at a target base station from one or more UEs can be used to calibrate one or more antenna arrays of the target base station. This technique is similar to the first technique, except that instead of neighboring base stations transmitting reference signals to the target base station, nearby UEs (possibly served by the target base station) transmit reference signals to the target base station.

As described above with reference to the first technique, the location of the target base station should be known by the network through some RAT (e.g., NR) or RAT-independent (e.g., GPS) technique. The locations of the involved UEs also need to be determined, and may be estimated by GPS or NR positioning techniques. To improve positioning accuracy, the involved UEs should be in the LOS condition with respect to the target base station. In addition, if possible, the involved UEs should be in an open space in order to receive reference signals (e.g., NR or GPS) with less attenuation and multi-path propagations.

There are other means to enhance UE positioning accuracy that should be utilized when possible. For example, if NR positioning is used, the UEs should be configured to use a high bandwidth (e.g., 100 MHz at FR1, 400 MHz at FR2) to transmit the reference signals. The UEs should also report their maximum capabilities related to positioning accuracy, such as their maximum supported bandwidth, group delay calibration error, etc. In some cases, a UE may have the capability to perform hybrid positioning (i.e., both RAT and RAT-independent positioning) to achieve greater positioning accuracy. This capability can also be reported to the network through the UE's capability report.

The involved UEs may be all UEs served by the target base station, all UEs within some proximity of the target base station that are able to participate in the calibration (e.g., based on user permission, device capability, etc.), a set of UEs with a previously estimated location within some threshold distance of the target base station, or the like. For example, every capable UE served by the target base station may perform a positioning procedure and report its location to the network. The network may then select some set of those UEs. For example, when possible, the UEs may be selected such that they are clustered to one side of the target base station and thereby facing one antenna array/panel of the target base station. In this case, the reference signals will likely be received, and the AoA measured, by that antenna array. As another example, the involved UEs may surround the target base station and as such, the reference signals may be received, and the AoAs measured, by all of the antenna arrays of the target base station.

The reference signals transmitted by the involved UEs may be SRS-for-positioning as defined in NR (also referred to as UL-PRS). Other reference signals designed specifically for antenna array calibration may also be used, but reusing existing SRS-for-positioning would allow backwards compatibility with existing devices. Given that the coarse spatial relation between the target base station and the UEs is known to the network (from the positioning procedures performed at the first stage), the SRS-for-positioning may be configured to be beamformed towards the target base station to reduce the impact of potential multi-paths.

Generally, the transmission of uplink reference signals (e.g., SRS-for-positioning) is configured by the serving base station. As such, if the target base station is the serving base station for the involved UEs, it will configure those UEs with the uplink resources (in time and frequency) on which to transmit the reference signals. If the target base station is not the serving base station for all of the involved UEs, the serving base station(s) will need to coordinate with the target base station to inform the target base station of the uplink resources on which the involved UEs will be transmitting the reference signals.

As with a current UL-AoA positioning procedure, each involved UE transmits the configured SRS-for-positioning to the target base station. The target base station measures the AoA associated with each UE (as described above with reference to FIG. 5) and can then conduct the antenna array orientation calibration as described above with reference to the first technique. Specifically, the target base station reports each AoA measurement with respect to the existing reference direction for that receiving antenna array. The network can derive the "genie" AoA between each UE and the target base station (specifically the receiving antenna array) based on the known locations of the target base station and the involved UEs determined in the first stage. The difference between a measured AoA and the corresponding "genie" AoA is the orientation offset of the receiving antenna array.

Once the orientation offset of an antenna array of the target base station is known, the network can use this offset to calibrate any AoA measurement reported from the target base station for that antenna array. Alternatively, as described above, the target base station may compute the offset locally, and notify the network or the involved UE(s) of the calibrated reference direction for the antenna array. In this case, any AoA reported by the target base station does not need to be calibrated at the network side, as the reference direction has been calibrated.

The disclosed antenna array orientation calibration techniques described herein do not need to be performed frequently, as any changes to the antenna array orientation are not expected to occur frequently in normal operation. As such, it would beneficial to have a mechanism to trigger the calibration process.

A first technique is to configure a long periodicity for the antenna array orientation calibration. This periodicity could be some number of days, weeks, months, or even years. As a second technique, if the network supports integrity and reliability measurements for positioning measurements (e.g., UL-AoA, DL-AoD), then once the integrity and reliability of an antenna array's AoA measurements falls below some threshold, the network can trigger an orientation calibration for the antenna array (or all antenna arrays of the base station). As a third technique, one or more UEs being served by a base station may perform location estimates using measurement other than AoA (whether RAT or RAT-independent measurements). The base station or the network may determine the offset between the "genie" AoA (as determined by the location estimates of the UE(s)) and the actual AoA measurements of the uplink reference signals transmitted by the UE(s). If the offset is larger than a threshold over the course of multiple AoA measurements, the network could trigger an antenna array orientation calibration.

In an aspect, while the different techniques described herein have described using neighboring base stations or UEs for antenna array orientation calibration, as will be appreciated, a mix of neighboring base stations and UEs could be used for the calibration.

Figure 7:
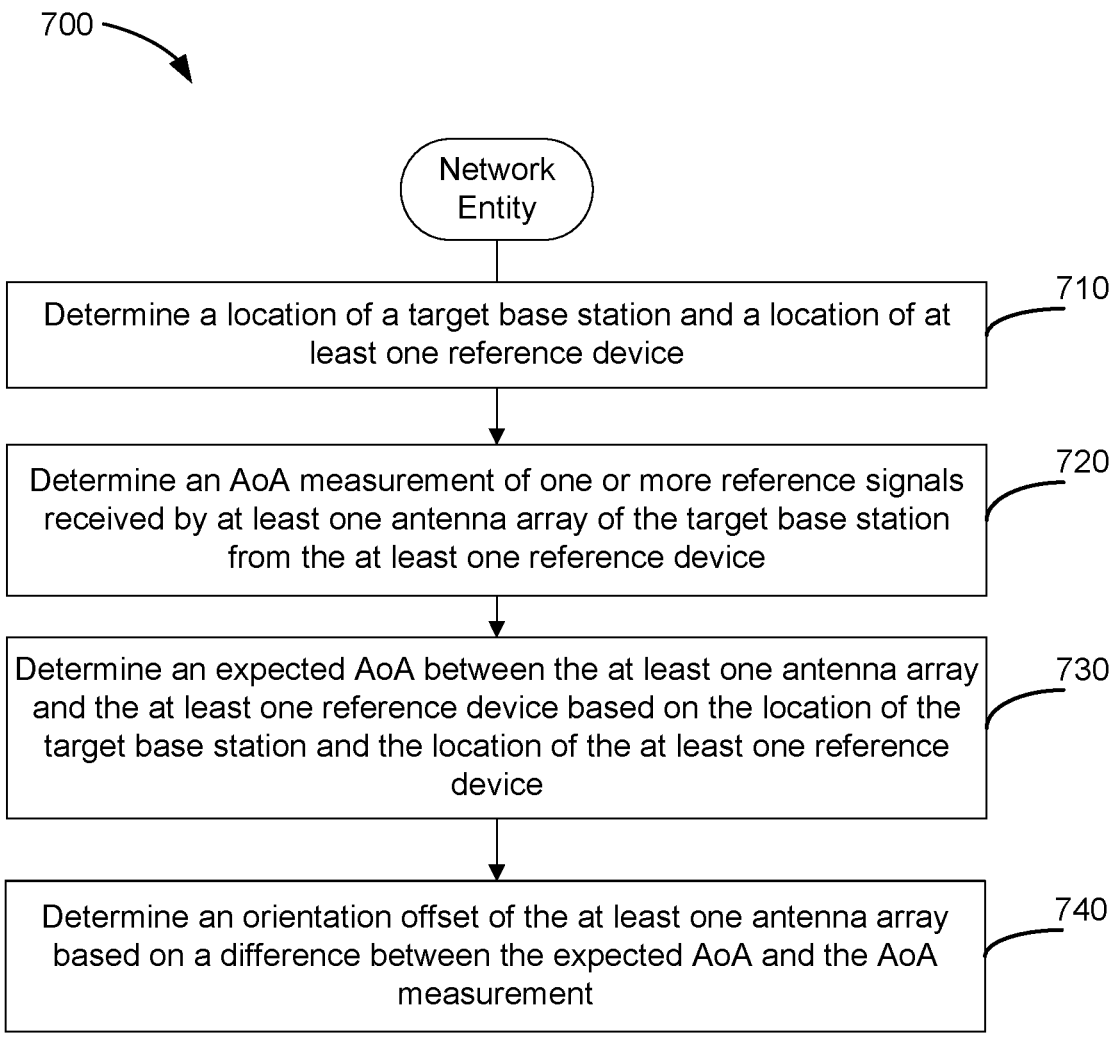
FIG. 7 illustrates an example method of wireless communication, according to aspects of the disclosure.

FIG. 7 illustrates an example method 700 of wireless communication, according to aspects of the disclosure. In an aspect, method 700 may be performed by a network entity, such as a location server (e.g., location server 230, LMF 270, SLP 272) or other entity of the core network (e.g., core network 170, 5GC 210, 5GC 260). The network entity may alternatively be a base station, such as any of the base stations described herein. The network entity may alternatively be a UE, such as any of the UEs described herein.

At 710, the network entity determines a location of a target base station (e.g., any of the base stations described herein) and a location of at least one reference device (e.g., any of the base stations or UEs described herein). In an aspect, where the network entity is a UE, operation 710 may be performed by the one or more WWAN transceivers 310, the one or more processors 332, memory 340, and/or positioning component 342, any or all of which may be considered means for performing this operation. In an aspect, where the network entity is a base station, operation 710 may be performed by the one or more WWAN transceivers 350, the one or more network transceivers 380, the one or more processors 384, memory 386, and/or positioning component 388, any or all of which may be considered means for performing this operation. In an aspect, where the network entity is an entity of the core network, operation 710 may be performed by the one or more network transceivers 390, the one or more processors 394, memory 396, and/or positioning component 398, any or all of which may be considered means for performing this operation.

At 720, the network entity determines an AoA measurement of one or more reference signals received by at least one antenna array of the target base station from the at least one reference device. In an aspect, where the network entity is a UE, operation 720 may be performed by the one or more WWAN transceivers 310, the one or more processors 332, memory 340, and/or positioning component 342, any or all of which may be considered means for performing this operation. In an aspect, where the network entity is a base station, operation 720 may be performed by the one or more WWAN transceivers 350, the one or more network transceivers 380, the one or more processors 384, memory 386, and/or positioning component 388, any or all of which may be considered means for performing this operation. In an aspect, where the network entity is an entity of the core network, operation 720 may be performed by the one or more network transceivers 390, the one or more processors 394, memory 396, and/or positioning component 398, any or all of which may be considered means for performing this operation.

At 730, the network entity determines an expected AoA between the at least one antenna array and the at least one reference device based on the location of the target base station and the location of the at least one reference device. In an aspect, where the network entity is a UE, operation 730 may be performed by the one or more WWAN transceivers 310, the one or more processors 332, memory 340, and/or positioning component 342, any or all of which may be considered means for performing this operation. In an aspect, where the network entity is a base station, operation 730 may be performed by the one or more WWAN transceivers 350, the one or more network transceivers 380, the one or more processors 384, memory 386, and/or positioning component 388, any or all of which may be considered means for performing this operation. In an aspect, where the network entity is an entity of the core network, operation 730 may be performed by the one or more network transceivers 390, the one or more processors 394, memory 396, and/or positioning component 398, any or all of which may be considered means for performing this operation.

At 740, the network entity determines an orientation offset of the at least one antenna array based on a difference between the expected AoA and the AoA measurement. In an aspect, where the network entity is a UE, operation 740 may be performed by the one or more WWAN transceivers 310, the one or more processors 332, memory 340, and/or positioning component 342, any or all of which may be considered means for performing this operation. In an aspect, where the network entity is a base station, operation 740 may be performed by the one or more WWAN transceivers 350, the one or more network transceivers 380, the one or more processors 384, memory 386, and/or positioning component 388, any or all of which may be considered means for performing this operation. In an aspect, where the network entity is an entity of the core network, operation 740 may be performed by the one or more network transceivers 390, the one or more processors 394, memory 396, and/or positioning component 398, any or all of which may be considered means for performing this operation.

In an aspect, where the network entity is a UE, the determining operations at 710 to 730 may include receiving these values (i.e., the location of the target base station, the location of the at least one reference device (if not the UE), the AoA measurement, and the expected AoA) from a third-party server, such as a crowdsourcing server. In that way, the UE may determine the orientation offset and report it back to the crowdsourcing server. The crowdsourcing server would not be a network entity.

As will be appreciated, a technical advantage of the method 700 is calibrating an orientation of an antenna array based on over-the-air signaling.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a network entity, comprising: determining a location of a target base station and a location of at least one network node; determining an angle of arrival (AoA) measurement of one or more reference signals received by at least one antenna array of the target base station from the at least one network node; determining an expected AoA between the at least one antenna array and the at least one network node based on the location of the target base station and the location of the at least one network node; and determining an orientation offset of the at least one antenna array based on a difference between the expected AoA and the AoA measurement.

Clause 2. The method of clause 1, further comprising: calibrating AoA measurements associated with the at least one antenna array based on the orientation offset.

Clause 3. The method of any of clauses 1 to 2, further comprising: storing the orientation offset in a memory of the network entity.

Clause 4. The method of any of clauses 1 to 3, wherein the at least one network node is at least one base station.

Clause 5. The method of clause 4, wherein the location of the target base station and the location of the at least one network node are determined using a satellite positioning system (SPS).

Clause 6. The method of any of clauses 4 to 5, wherein the one or more reference signals comprise one or more positioning reference signals (PRS), one or more channel state information reference signals (CSI-RS), or one or more sounding reference signals (SRS).

Clause 7. The method of any of clauses 1 to 6, wherein the network entity comprises a core network entity.

Clause 8. The method of clause 7, wherein: determining the location of the target base station and the location of the at least one network node comprises obtaining the location of the target base station and the location of the at least one network node from the target base station, the at least one network node, a user equipment (UE) involved in a downlink AoA positioning session with the target base station, a memory of the network entity, or any combination thereof, and determining the AoA measurement comprises obtaining the AoA measurement from the target base station, the at least one network node, the UE, the memory of the network entity, or any combination thereof.

Clause 9. The method of any of clauses 7 to 8, wherein determining the expected AoA comprises obtaining the expected AoA from the target base station, the at least one network node, a UE involved in a downlink AoA positioning session with the target base station, a memory of the network entity, or any combination thereof.

Clause 10. The method of any of clauses 7 to 9, further comprising: transmitting a configuration for the one or more reference signals to the target base station and the at least one network node.

Clause 11. The method of clause 10, wherein the configuration indicates time and/or frequency resources on which the at least one network node is to transmit the one or more reference signals.

Clause 12. The method of any of clauses 10 to 11, wherein the configuration indicates a direction in which to beamform the one or more reference signals.

Clause 13. The method of any of clauses 7 to 12, further comprising: selecting the at least one network node from a plurality of network nodes.

Clause 14. The method of clause 13, wherein the at least one network node is selected based on: the at least one network node being within a threshold distance of the target base station, channel conditions between the at least one network node and the target base station indicating that the at least one network node and the target base station are within line-of-site of each other, reception of a recommendation of the at least one network node from the target base station, or any combination thereof.

Clause 15. The method of any of clauses 1 to 6, wherein the network entity comprises the target base station.

Clause 16. The method of clause 15, wherein: determining the location of the at least one network node comprises obtaining the location of the at least one network node from the at least one network node, a UE involved in a downlink AoA positioning session with the target base station, a core network entity, a memory of the network entity, or any combination thereof, and determining the AoA measurement comprises measuring the AoA measurement.

Clause 17. The method of any of clauses 15 to 16, further comprising: transmitting a configuration for the one or more reference signals to the at least one network node.

Clause 18. The method of clause 17, wherein the configuration indicates a direction in which to beamform the one or more reference signals.

Clause 19. The method of any of clauses 1 to 18, wherein the AoA measurement is relative to a reference direction of the at least one antenna array.

Clause 20. The method of clause 19, wherein the determining the orientation offset comprises: determining the difference between the expected AoA and the AoA measurement; and determining the orientation offset of the at least one antenna array based on the reference direction and the difference between the expected AoA and the AoA measurement.

Clause 21. The method of any of clauses 19 to 20, wherein the reference direction is in a local coordinate system of the target base station.

Clause 22. The method of any of clauses 1 to 3 and 7 to 21, wherein the at least one network node is at least one user equipment (UE).

Clause 23. The method of clause 22, wherein the location of the at least one network node is determined using a satellite positioning system (SPS) or a cellular-based positioning method.

Clause 24. The method of any of clauses 22 to 23, wherein the one or more reference signals comprise one or more SRS-for-positioning.

Clause 25. The method of any of clauses 22 to 24, further comprising: receiving, from the at least one network node, a capability report indicating capabilities of the at least one network node related to transmitting uplink reference signals for positioning.

Clause 26. The method of any of clauses 1 to 25, wherein the network entity periodically determines the orientation offset of the at least one antenna array.

Clause 27. The method of any of clauses 1 to 26, wherein the network entity determines the orientation offset of the at least one antenna array based on an integrity and reliability of the AoA measurement being below a threshold.

Clause 28. The method of any of clauses 1 to 27, wherein the network entity determines the orientation offset of the at least one antenna array based on the difference between the expected AoA and the AoA measurement being greater than a threshold.

Clause 29. The method of any of clauses 1 to 6 and 19 to 28, wherein the network entity comprises a UE.

Clause 30. The method of clause 29, wherein: determining the location of the target base station and the location of the at least one network node comprises obtaining the location of the target base station and the location of the at least one network node from the target base station, the at least one network node, a third party server, or any combination thereof, determining the AoA measurement comprises obtaining the AoA measurement from the target base station, the at least one network node, the third party server, or any combination thereof, and determining the expected AoA comprises obtaining the expected AoA from the target base station, the at least one network node, the third party server, or any combination thereof.

Clause 31. An apparatus comprising a memory, at least one transceiver, and at least one processor communicatively coupled to the memory and the at least one transceiver, the memory, the at least one transceiver, and the at least one processor configured to perform a method according to any of clauses 1 to 30.

Clause 32. An apparatus comprising means for performing a method according to any of clauses 1 to 30.

Clause 33. A non-transitory computer-readable medium storing computer-executable instructions, the computer-executable comprising at least one instruction for causing a computer or processor to perform a method according to any of clauses 1 to 30.

Additional implementation examples are described in the following numbered clauses:

Clause 1. A method of wireless communication performed by a network entity, comprising: determining a location of a target base station and a location of at least one reference device; determining an angle-of-arrival (AoA) measurement of one or more reference signals received by at least one antenna array of the target base station from the at least one reference device; determining an expected AoA between the at least one antenna array and the at least one reference device based on the location of the target base station and the location of the at least one reference device; and determining an orientation offset of the at least one antenna array based on a difference between the expected AoA and the AoA measurement.

Clause 2. The method of clause 1, further comprising: calibrating AoA measurements associated with the at least one antenna array based on the orientation offset.

Clause 3. The method of any of clauses 1 to 2, wherein the at least one reference device is at least one base station.

Clause 4. The method of clause 3, wherein the one or more reference signals comprise one or more positioning reference signals (PRS), one or more channel state information reference signals (CSI-RS), or one or more sounding reference signals (SRS).

Clause 5. The method of any of clauses 1 to 4, wherein the network entity comprises a core network entity.

Clause 6. The method of clause 5, wherein: determining the location of the target base station and the location of the at least one reference device comprises obtaining the location of the target base station and the location of the at least one reference device from the target base station, the at least one reference device, a user equipment (UE) involved in an uplink AoA positioning session with the target base station, a memory of the network entity, or any combination thereof, determining the AoA measurement comprises obtaining the AoA measurement from the target base station, the at least one reference device, the UE, the memory of the network entity, or any combination thereof, and determining the expected AoA comprises obtaining the expected AoA from the target base station, the at least one reference device, the UE, the memory of the network entity, or any combination thereof.

Clause 7. The method of any of clauses 5 to 6, further comprising: transmitting a configuration for the one or more reference signals to the target base station and the at least one reference device.

Clause 8. The method of clause 7, wherein the configuration indicates time and/or frequency resources on which the at least one reference device is to transmit the one or more reference signals.

Clause 9. The method of any of clauses 7 to 8, wherein the configuration indicates a direction in which to beamform the one or more reference signals.

Clause 10. The method of any of clauses 5 to 9, further comprising: selecting the at least one reference device from a plurality of reference devices.

Clause 11. The method of clause 10, wherein the at least one reference device is selected based on: the at least one reference device being within a threshold distance of the target base station, channel conditions between the at least one reference device and the target base station indicating that the at least one reference device and the target base station are within line-of-site of each other, reception of a recommendation of the at least one reference device from the target base station, or any combination thereof.

Clause 12. The method of any of clauses 1 to 4, wherein the network entity is the target base station.

Clause 13. The method of clause 12, wherein: determining the location of the at least one reference device comprises obtaining the location of the at least one reference device from the at least one reference device, a UE involved in an uplink AoA positioning session with the target base station, a core network entity, a memory of the network entity, or any combination thereof, and determining the AoA measurement comprises measuring an AoA of the one or more reference signals.

Clause 14. The method of any of clauses 12 to 13, further comprising: transmitting a configuration for the one or more reference signals to the at least one reference device.

Clause 15. The method of clause 14, wherein the configuration indicates a direction in which to beamform the one or more reference signals.

Clause 16. The method of any of clauses 1 to 15, wherein the AoA measurement is relative to a reference direction of the at least one antenna array.

Clause 17. The method of clause 16, wherein determining the orientation offset comprises: determining the difference between the expected AoA and the AoA measurement; and determining the orientation offset of the at least one antenna array based on the reference direction and the difference between the expected AoA and the AoA measurement.

Clause 18. The method of any of clauses 1, 2, and 4 to 17, wherein the at least one reference device is at least one user equipment (UE).

Clause 19. The method of any of clauses 1 to 18, wherein the location of the target base station and the location of the at least one reference device are determined using a satellite positioning system (SPS) or a cellular-based positioning method.

Clause 20. The method of any of clauses 1 to 19, wherein the orientation offset of the at least one antenna array is determined periodically.

Clause 21. The method of any of clauses 1 to 20, wherein the orientation offset of the at least one antenna array is determined based on an integrity and reliability of the AoA measurement being below a threshold.

Clause 22. The method of any of clauses 1 to 21, wherein the orientation offset of the at least one antenna array is determined based on the difference between the expected AoA and the AoA measurement being greater than a threshold.

Clause 23. A network entity, comprising: a memory; at least one transceiver; and at least one processor communicatively coupled to the memory and the at least one transceiver, the at least one processor configured to: determine a location of a target base station and a location of at least one reference device; determine an angle-of-arrival (AoA) measurement of one or more reference signals received by at least one antenna array of the target base station from the at least one reference device; determine an expected AoA between the at least one antenna array and the at least one reference device based on the location of the target base station and the location of the at least one reference device; and determine an orientation offset of the at least one antenna array based on a difference between the expected AoA and the AoA measurement.

Clause 24. The network entity of clause 23, wherein the at least one processor is further configured to: calibrate AoA measurements associated with the at least one antenna array based on the orientation offset.

Clause 25. The network entity of any of clauses 23 to 24, wherein the at least one reference device is at least one base station.

Clause 26. The network entity of clause 25, wherein the one or more reference signals comprise one or more positioning reference signals (PRS), one or more channel state information reference signals (CSI-RS), or one or more sounding reference signals (SRS).

Clause 27. The network entity of any of clauses 23 to 26, wherein the network entity comprises a core network entity.

Clause 28. The network entity of clause 27, wherein the at least one processor being configured to: determine the location of the target base station and the location of the at least one reference device comprises the at least one processor being configured to obtain the location of the target base station and the location of the at least one reference device from the target base station, the at least one reference device, a user equipment (UE) involved in an uplink AoA positioning session with the target base station, a memory of the network entity, or any combination thereof, determine the AoA measurement comprises the at least one processor being configured to obtain the AoA measurement from the target base station, the at least one reference device, the UE, the memory of the network entity, or any combination thereof, and determine the expected AoA comprises the at least one processor being configured to obtain the expected AoA from the target base station, the at least one reference device, the UE, the memory of the network entity, or any combination thereof.

Clause 29. The network entity of any of clauses 27 to 28, wherein the at least one processor is further configured to: transmit, via the at least one transceiver, a configuration for the one or more reference signals to the target base station and the at least one reference device.

Clause 30. The network entity of clause 29, wherein the configuration indicates time and/or frequency resources on which the at least one reference device is to transmit the one or more reference signals.

Clause 31. The network entity of any of clauses 29 to 30, wherein the configuration indicates a direction in which to beamform the one or more reference signals.

Clause 32. The network entity of any of clauses 27 to 31, wherein the at least one processor is further configured to: select the at least one reference device from a plurality of reference devices.

Clause 33. The network entity of clause 32, wherein the at least one reference device is selected based on: the at least one reference device being within a threshold distance of the target base station, channel conditions between the at least one reference device and the target base station indicating that the at least one reference device and the target base station are within line-of-site of each other, reception of a recommendation of the at least one reference device from the target base station, or any combination thereof.

Clause 34. The network entity of any of clauses 23 to 26, wherein the network entity is the target base station.

Clause 35. The network entity of clause 34, wherein the at least one processor being configured to: determine the location of the at least one reference device comprises the at least one processor being configured to obtain the location of the at least one reference device from the at least one reference device, a UE involved in an uplink AoA positioning session with the target base station, a core network entity, a memory of the network entity, or any combination thereof, and determine the AoA measurement comprises the at least one processor being configured to measure an AoA of the one or more reference signals.

Clause 36. The network entity of any of clauses 34 to 35, wherein the at least one processor is further configured to: transmit, via the at least one transceiver, a configuration for the one or more reference signals to the at least one reference device.

Clause 37. The network entity of clause 36, wherein the configuration indicates a direction in which to beamform the one or more reference signals.

Clause 38. The network entity of any of clauses 23 to 37, wherein the AoA measurement is relative to a reference direction of the at least one antenna array.

Clause 39. The network entity of clause 38, wherein the at least one processor configured to determine the orientation offset comprises the at least one processor configured to: determine the difference between the expected AoA and the AoA measurement; and determine the orientation offset of the at least one antenna array based on the reference direction and the difference between the expected AoA and the AoA measurement.

Clause 40. The network entity of any of clauses 23, 24, and 26 to 39, wherein the at least one reference device is at least one user equipment (UE).

Clause 41. The network entity of any of clauses 23 to 40, wherein the location of the target base station and the location of the at least one reference device are determined using a satellite positioning system (SPS) or a cellular-based positioning method.

Clause 42. The network entity of any of clauses 23 to 41, wherein the orientation offset of the at least one antenna array is determined periodically.

Clause 43. The network entity of any of clauses 23 to 42, wherein the orientation offset of the at least one antenna array is determined based on an integrity and reliability of the AoA measurement being below a threshold.

Clause 44. The network entity of any of clauses 23 to 43, wherein the orientation offset of the at least one antenna array is determined based on the difference between the expected AoA and the AoA measurement being greater than a threshold.

Clause 45. A network entity, comprising: means for determining a location of a target base station and a location of at least one reference device; means for determining an angle-of-arrival (AoA) measurement of one or more reference signals received by at least one antenna array of the target base station from the at least one reference device; means for determining an expected AoA between the at least one antenna array and the at least one reference device based on the location of the target base station and the location of the at least one reference device; and means for determining an orientation offset of the at least one antenna array based on a difference between the expected AoA and the AoA measurement.

Clause 46. The network entity of clause 45, further comprising: means for calibrating AoA measurements associated with the at least one antenna array based on the orientation offset.

Clause 47. The network entity of any of clauses 45 to 46, wherein the at least one reference device is at least one base station.

Clause 48. The network entity of clause 47, wherein the one or more reference signals comprise one or more positioning reference signals (PRS), one or more channel state information reference signals (CSI-RS), or one or more sounding reference signals (SRS).

Clause 49. The network entity of any of clauses 45 to 48, wherein the network entity comprises a core network entity.

Clause 50. The network entity of clause 49, wherein: the means for determining the location of the target base station and the location of the at least one reference device comprises means for obtaining the location of the target base station and the location of the at least one reference device from the target base station, the at least one reference device, a user equipment (UE) involved in an uplink AoA positioning session with the target base station, a memory of the network entity, or any combination thereof, the means for determining the AoA measurement comprises means for obtaining the AoA measurement from the target base station, the at least one reference device, the UE, the memory of the network entity, or any combination thereof, and the means for determining the expected AoA comprises means for obtaining the expected AoA from the target base station, the at least one reference device, the UE, the memory of the network entity, or any combination thereof.

Clause 51. The network entity of any of clauses 49 to 50, further comprising: means for transmitting a configuration for the one or more reference signals to the target base station and the at least one reference device.

Clause 52. The network entity of clause 51, wherein the configuration indicates time and/or frequency resources on which the at least one reference device is to transmit the one or more reference signals.

Clause 53. The network entity of any of clauses 51 to 52, wherein the configuration indicates a direction in which to beamform the one or more reference signals.

Clause 54. The network entity of any of clauses 49 to 53, further comprising: means for selecting the at least one reference device from a plurality of reference devices.

Clause 55. The network entity of clause 54, wherein the at least one reference device is selected based on: the at least one reference device being within a threshold distance of the target base station, channel conditions between the at least one reference device and the target base station indicating that the at least one reference device and the target base station are within line-of-site of each other, reception of a recommendation of the at least one reference device from the target base station, or any combination thereof.

Clause 56. The network entity of any of clauses 45 to 48, wherein the network entity is the target base station.

Clause 57. The network entity of clause 56, wherein: the means for determining the location of the at least one reference device comprises means for obtaining the location of the at least one reference device from the at least one reference device, a UE involved in an uplink AoA positioning session with the target base station, a core network entity, a memory of the network entity, or any combination thereof, and the means for determining the AoA measurement comprises means for measuring an AoA of the one or more reference signals.

Clause 58. The network entity of any of clauses 56 to 57, further comprising: means for transmitting a configuration for the one or more reference signals to the at least one reference device.

Clause 59. The network entity of clause 58, wherein the configuration indicates a direction in which to beamform the one or more reference signals.

Clause 60. The network entity of any of clauses 45 to 59, wherein the AoA measurement is relative to a reference direction of the at least one antenna array.

Clause 61. The network entity of clause 60, wherein the means for determining the orientation offset comprises: means for determining the difference between the expected AoA and the AoA measurement; and means for determining the orientation offset of the at least one antenna array based on the reference direction and the difference between the expected AoA and the AoA measurement.

Clause 62. The network entity of any of clauses 45, 46, and 48 to 61, wherein the at least one reference device is at least one user equipment (UE).

Clause 63. The network entity of any of clauses 45 to 62, wherein the location of the target base station and the location of the at least one reference device are determined using a satellite positioning system (SPS) or a cellular-based positioning method.

Clause 64. The network entity of any of clauses 45 to 63, wherein the orientation offset of the at least one antenna array is determined periodically.

Clause 65. The network entity of any of clauses 45 to 64, wherein the orientation offset of the at least one antenna array is determined based on an integrity and reliability of the AoA measurement being below a threshold.

Clause 66. The network entity of any of clauses 45 to 65, wherein the orientation offset of the at least one antenna array is determined based on the difference between the expected AoA and the AoA measurement being greater than a threshold.

Clause 67. A non-transitory computer-readable medium storing computer-executable instructions that, when executed by a network entity, cause the network entity to: determine a location of a target base station and a location of at least one reference device; determine an angle-of-arrival (AoA) measurement of one or more reference signals received by at least one antenna array of the target base station from the at least one reference device; determine an expected AoA between the at least one antenna array and the at least one reference device based on the location of the target base station and the location of the at least one reference device; and determine an orientation offset of the at least one antenna array based on a difference between the expected AoA and the AoA measurement.

Clause 68. The non-transitory computer-readable medium of clause 67, wherein the computer-executable instructions further cause the network entity to: calibrate AoA measurements associated with the at least one antenna array based on the orientation offset.

Clause 69. The non-transitory computer-readable medium of any of clauses 67 to 68, wherein the at least one reference device is at least one base station.

Clause 70. The non-transitory computer-readable medium of clause 69, wherein the one or more reference signals comprise one or more positioning reference signals (PRS), one or more channel state information reference signals (CSI-RS), or one or more sounding reference signals (SRS).

Clause 71. The non-transitory computer-readable medium of any of clauses 67 to 70, wherein the network entity comprises a core network entity.

Clause 72. The non-transitory computer-readable medium of clause 71, wherein the computer-executable instructions that cause the network entity to: determine the location of the target base station and the location of the at least one reference device comprise computer-executable instructions that cause the network entity to obtain the location of the target base station and the location of the at least one reference device from the target base station, the at least one reference device, a user equipment (UE) involved in an uplink AoA positioning session with the target base station, a memory of the network entity, or any combination thereof, determine the AoA measurement comprise computer-executable instructions that cause the network entity to obtain the AoA measurement from the target base station, the at least one reference device, the UE, the memory of the network entity, or any combination thereof, and determine the expected AoA comprise computer-executable instructions that cause the network entity to obtain the expected AoA from the target base station, the at least one reference device, the UE, the memory of the network entity, or any combination thereof.

Clause 73. The non-transitory computer-readable medium of any of clauses 71 to 72, wherein the computer-executable instructions further cause the network entity to: transmit a configuration for the one or more reference signals to the target base station and the at least one reference device.

Clause 74. The non-transitory computer-readable medium of clause 73, wherein the configuration indicates time and/or frequency resources on which the at least one reference device is to transmit the one or more reference signals.

Clause 75. The non-transitory computer-readable medium of any of clauses 73 to 74, wherein the configuration indicates a direction in which to beamform the one or more reference signals.

Clause 76. The non-transitory computer-readable medium of any of clauses 71 to 75, wherein the computer-executable instructions further cause the network entity to: select the at least one reference device from a plurality of reference devices.

Clause 77. The non-transitory computer-readable medium of clause 76, wherein the at least one reference device is selected based on: the at least one reference device being within a threshold distance of the target base station, channel conditions between the at least one reference device and the target base station indicating that the at least one reference device and the target base station are within line-of-site of each other, reception of a recommendation of the at least one reference device from the target base station, or any combination thereof.

Clause 78. The non-transitory computer-readable medium of any of clauses 67 to 70, wherein the network entity is the target base station.

Clause 79. The non-transitory computer-readable medium of clause 78, wherein the computer-executable instructions that cause the network entity to: determine the location of the at least one reference device comprise computer-executable instructions that cause the network entity to obtain the location of the at least one reference device from the at least one reference device, a UE involved in an uplink AoA positioning session with the target base station, a core network entity, a memory of the network entity, or any combination thereof, and determine the AoA measurement comprise computer-executable instructions that cause the network entity to measure an AoA of the one or more reference signals.

Clause 80. The non-transitory computer-readable medium of any of clauses 78 to 79, wherein the computer-executable instructions further cause the network entity to: transmit a configuration for the one or more reference signals to the at least one reference device.

Clause 81. The non-transitory computer-readable medium of clause 80, wherein the configuration indicates a direction in which to beamform the one or more reference signals.

Clause 82. The non-transitory computer-readable medium of any of clauses 67 to 81, wherein the AoA measurement is relative to a reference direction of the at least one antenna array.

Clause 83. The non-transitory computer-readable medium of clause 82, wherein the computer-executable instructions that, when executed, cause the network entity to determine the orientation offset comprise computer-executable instructions that, when executed, cause the network entity to: determine the difference between the expected AoA and the AoA measurement; and determine the orientation offset of the at least one antenna array based on the reference direction and the difference between the expected AoA and the AoA measurement.

Clause 84. The non-transitory computer-readable medium of any of clauses 67, 68, and 70 to 83, wherein the at least one reference device is at least one user equipment (UE).

Clause 85. The non-transitory computer-readable medium of any of clauses 67 to 84, wherein the location of the target base station and the location of the at least one reference device are determined using a satellite positioning system (SPS) or a cellular-based positioning method.

Clause 86. The non-transitory computer-readable medium of any of clauses 67 to 85, wherein the orientation offset of the at least one antenna array is determined periodically.

Clause 87. The non-transitory computer-readable medium of any of clauses 67 to 86, wherein the orientation offset of the at least one antenna array is determined based on an integrity and reliability of the AoA measurement being below a threshold.

Clause 88. The non-transitory computer-readable medium of any of clauses 67 to 87, wherein the orientation offset of the at least one antenna array is determined based on the difference between the expected AoA and the AoA measurement being greater than a threshold.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a core network entity, comprising:
   obtaining a location of a target base station and a location of at least one reference device, the at least one reference device, a user equipment (UE) involved in an uplink AoA positioning session with the target base station, a memory of the network entity, or any combination thereof;
   obtaining an angle-of-arrival (AoA) measurement of one or more reference signals received by at least one antenna array of the target base station from the at least one reference device, the at least one reference device, the UE, the memory of the network entity, or any combination thereof;
   obtaining an expected AoA between the at least one antenna array and the at least one reference device based on the location of the target base station and the location of the at least one reference device, the at least one reference device, the UE, the memory of the network entity, or any combination thereof; and
   determining an orientation offset of the at least one antenna array based on a difference between the expected AoA and the AoA measurement.

2. The method of claim 1, further comprising:
   calibrating AoA measurements associated with the at least one antenna array based on the orientation offset.

3. The method of claim 1, wherein the at least one reference device is at least one base station.

4. The method of claim 3, wherein the one or more reference signals comprise one or more positioning reference signals (PRS), one or more channel state information reference signals (CSI-RS), or one or more sounding reference signals (SRS).

5. The method of claim 1, further comprising:
   transmitting a configuration for the one or more reference signals to the target base station and the at least one reference device.

6. The method of claim 5, wherein the configuration indicates time and/or frequency resources on which the at least one reference device is to transmit the one or more reference signals.

7. The method of claim 5, wherein the configuration indicates a direction in which to beamform the one or more reference signals.

8. The method of claim 1, further comprising:
   selecting the at least one reference device from a plurality of reference devices.

9. The method of claim 8, wherein the at least one reference device is selected based on:
   the at least one reference device being within a threshold distance of the target base station,
   channel conditions between the at least one reference device and the target base station indicating that the at least one reference device and the target base station are within line-of-site of each other,
   reception of a recommendation of the at least one reference device from the target base station, or
   any combination thereof.

10. The method of claim 1, wherein the core network entity is the target base station.

11. The method of claim 10, wherein:
    obtaining the AoA measurement comprises measuring an AoA of the one or more reference signals.

12. The method of claim 10, further comprising:
    transmitting a configuration for the one or more reference signals to the at least one reference device.

13. The method of claim 12, wherein the configuration indicates a direction in which to beamform the one or more reference signals.

14. The method of claim 1, wherein the AoA measurement is relative to a reference direction of the at least one antenna array.

15. The method of claim 14, wherein determining the orientation offset comprises:
- determining the difference between the expected AoA and the AoA measurement; and
- determining the orientation offset of the at least one antenna array based on the reference direction and the difference between the expected AoA and the AoA measurement.

16. The method of claim 1, wherein the at least one reference device is at least one user equipment (UE).

17. The method of claim 1, wherein the location of the target base station and the location of the at least one reference device are determined using a satellite positioning system (SPS) or a cellular-based positioning method.

18. The method of claim 1, wherein the orientation offset of the at least one antenna array is determined periodically.

19. The method of claim 1, wherein the orientation offset of the at least one antenna array is determined based on an integrity and reliability of the AoA measurement being below a threshold.

20. The method of claim 1, wherein the orientation offset of the at least one antenna array is determined based on the difference between the expected AoA and the AoA measurement being greater than a threshold.

21. A core network entity, comprising:
- a memory;
- at least one transceiver; and
- at least one processor communicatively coupled to the memory and the at least one transceiver, the at least one processor configured to:
  - obtain a location of a target base station and a location of at least one reference device, the at least one reference device, a user equipment (UE) involved in an uplink AoA positioning session with the target base station, a memory of the network entity, or any combination thereof;
  - obtain an angle-of-arrival (AoA) measurement of one or more reference signals received by at least one antenna array of the target base station from the at least one reference device, the at least one reference device, the UE, the memory of the network entity, or any combination thereof;
  - obtain an expected AoA between the at least one antenna array and the at least one reference device based on the location of the target base station and the location of the at least one reference device, the at least one reference device, the UE, the memory of the network entity, or any combination thereof; and
  - determine an orientation offset of the at least one antenna array based on a difference between the expected AoA and the AoA measurement.

22. The network entity of claim 21, wherein the at least one processor is further configured to:
- calibrate AoA measurements associated with the at least one antenna array based on the orientation offset.

23. The network entity of claim 21, wherein the at least one reference device is at least one base station.

24. The network entity of claim 21, wherein the core network entity is the target base station.

25. The network entity of claim 21, wherein the at least one reference device is at least one user equipment (UE).

26. A core network entity, comprising:
- means for obtaining a location of a target base station and a location of at least one reference device, the at least one reference device, a user equipment (UE) involved in an uplink AoA positioning session with the target base station, a memory of the network entity, or any combination thereof;
- means for obtaining an angle-of-arrival (AoA) measurement of one or more reference signals received by at least one antenna array of the target base station from the at least one reference device, the at least one reference device, the UE, the memory of the network entity, or any combination thereof;
- means for obtaining an expected AoA between the at least one antenna array and the at least one reference device based on the location of the target base station and the location of the at least one reference device, the at least one reference device, the UE, the memory of the network entity, or any combination thereof; and
- means for determining an orientation offset of the at least one antenna array based on a difference between the expected AoA and the AoA measurement.

27. A non-transitory computer-readable medium storing computer-executable instructions that, when executed by a network entity, cause the network entity to:
- obtain a location of a target base station and a location of at least one reference device, the at least one reference device, a user equipment (UE) involved in an uplink AoA positioning session with the target base station, a memory of the network entity, or any combination thereof;
- obtain an angle-of-arrival (AoA) measurement of one or more reference signals received by at least one antenna array of the target base station from the at least one reference device, the at least one reference device, the UE, the memory of the network entity, or any combination thereof;
- obtain an expected AoA between the at least one antenna array and the at least one reference device based on the location of the target base station and the location of the at least one reference device, the at least one reference device, the UE, the memory of the network entity, or any combination thereof; and
- determine an orientation offset of the at least one antenna array based on a difference between the expected AoA and the AoA measurement.

* * * * *